(12) United States Patent
Jang

(10) Patent No.: US 6,198,868 B1
(45) Date of Patent: Mar. 6, 2001

(54) TEMPERATURE COMPENSATED LONG PERIOD OPTICAL FIBER GRATING FILTER

(75) Inventor: Joo-Nyung Jang, Seoul (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/521,942

(22) Filed: Mar. 9, 2000

(30) Foreign Application Priority Data

Mar. 12, 1999 (KR) .................................................. 99-8332

(51) Int. Cl.[7] ...................................................... G02B 6/02
(52) U.S. Cl. ............................................................. 385/128
(58) Field of Search ................................. 385/12, 1, 123, 385/127, 128, 141, 27, 28, 31, 37; 250/227.11, 227.14

(56) References Cited

U.S. PATENT DOCUMENTS

| | | |
|---|---|---|
| 5,042,898 | 8/1991 | Morey et al. . |
| 5,077,816 | 12/1991 | Glomb et al. . |
| 5,694,503 | 12/1997 | Fleming et al. . |
| 5,703,978 | 12/1997 | DiGiovanni et al. . |
| 5,757,540 | 5/1998 | Judkins et al. . |
| 5,999,671 | 12/1999 | Jin et al. . |
| 6,011,886 | 1/2000 | Abramov et al. . |
| 6,058,226 * | 5/2000 | Dmitry .................................. 385/128 |

* cited by examiner

Primary Examiner—Akm E. Ullah
(74) Attorney, Agent, or Firm—Robert E. Bushnell, Esq.

(57) ABSTRACT

Disclosed is a temperature compensated long period optical fiber grating filter. The long period optical fiber grating filter includes a core formed with a long period grating, a cladding surrounding the core, a coating coated over a portion of the cladding not surrounding the long period grating, and a re-coating coated over a portion of the cladding surrounding the long period and made of a material exhibiting an increase in refractive index in accordance with an increase in temperature, the re-coating serving to allow a coupling wavelength shift caused by the increase in refractive index to be carried out in a direction opposite to that of a coupling wavelength shift caused by a refractive all index difference between the core and the cladding. In accordance with this long period optical fiber grating filter, a temperature compensation can be more easily achieved without any inconvenience caused by an adjustment of refractive index in the filter or an addition of a material for avoiding a variation in refractive index depending on temperature.

7 Claims, 7 Drawing Sheets

TEMPERATURE COMPENSATED LONG PERIOD OPTICAL FIBER GRATING FILTER

CLAIM OF PRIORITY

This application makes reference to, incorporates the same herein, and claims all benefits accruing under 35 U.S.C. §119 arising from an application for a TEMPERATURE-COMPENSATED LONG PERIOD OPTICAL FIBER GRATING FILTER earlier filed in the Korean Industrial Property Office on Mar. 12, 1999 and there duly assigned Ser. No. 8332/1999.

BACKGROUND OF THE INVENTION

1. Field of the Invention

The present invention relates to a temperature compensated long period optical fiber grating filter.

2. Description of the Related Art

Generally, a long period optical fiber grating filter is an optical device for coupling modes propagated in the core of an optical fiber to modes propagated in the cladding of the optical fiber. Such a long period optical fiber grating filter provides an advantage in terms of the gain flatness of erbium-doped optical fiber amplifiers (EDFAs) in that it is of a mode-coupling type other than a reflective mode-coupling type. Such a long period optical fiber grating is manufactured to exhibit a periodic variation in refractive index at its core. The periodic variation in refractive index is obtained by periodically exposing the core of an optical fiber, sensitive to ultraviolet rays, in the optical fiber grating to ultraviolet rays in the process of manufacturing the optical fiber grating. That is, an increase in refractive index is exhibited at portions of the core exposed to ultraviolet rays whereas no variation in refractive index occurs at the remaining portions of the core not exposed to ultraviolet rays. Thus, a periodic variation in refractive index is exhibited in the core. In such a long period optical fiber grating, a mode coupling occurs in a state in which a phase matching condition expressed by the following Expression 1 is satisfied.

$$\beta_{co} - \beta_{cl}^{(m)} = 2\pi/\Lambda \qquad \text{[EXPRESSION 1]}$$

where, $\beta_{co}$ represents a propagation constant of a core mode, $\beta_{cl}$ represents a propagation constant of an m-th cladding mode, and $\Lambda$ represents a grating period.

Where $\beta = 2\pi n/\lambda$ is substituted into Expression 1 ("n" represents a refractive index, and $\lambda$ represents a wavelength), the refractive index difference between the core and cladding modes is derived which corresponds to $n_{co} - n_{cl}^{(m)} = \lambda/\Lambda$. Accordingly, a change of light with a certain wavelength into a cladding mode can be achieved by appropriately determining a desired grating period $\Lambda$ and a desired refractive index difference $n_{co} - n_{cl}^{(m)}$.

A desired refractive index difference can be obtained by appropriately radiating an ultraviolet laser onto the optical fiber which is sensitive to ultraviolet rays. That is, the optical fiber sensitive to ultraviolet rays is masked by a mask having a particular period. When a laser is then radiated onto the mask, the opto-sensitive optical fiber generates a reaction resulting in a variation in the refractive index of the core. In order to obtain a desired spectrum, that is, a desired coupling wavelength and a desired extinction ratio, the radiation of the ultraviolet laser should be carried out for an appropriate period of time by accurately adjusting the mask period.

The coupling wavelength of the long period optical fiber grating manufactured as mentioned above is also influenced by temperature. A shift of coupling wavelength depending on a variation in temperature is based on a variation in refractive index depending on the temperature variation and a thermal expansion in length depending on the temperature variation. This can be expressed by the following Expression 2:

$$\frac{d\lambda^m}{dT} = \frac{d\lambda^m}{dn}\frac{dn}{dT} + \frac{d\lambda^m}{d\Lambda}\frac{d\Lambda}{dT} \qquad \text{[EXPRESSION 2]}$$

where, T represents a temperature.

Where a long period optical fiber grating is applied to general optical fibers for communication or dispersion shifted optical fibers, the second term of the right side in Expression 2 is not taken into consideration because the value defined by the first term of the right side in Expression 2 is greater than the value defined by the second term by about several ten times. For instance, the Flexcor 1060 manufactured by Corning Glass Corporation exhibits a coupling wavelength of about 5 nm per 100 C. Typical dispersion shifted optical fibers exhibit a coupling wavelength shift of about 0.3 nm per 100 C due to a variation in refractive index occurs while exhibiting a coupling wavelength shift of about 5 mn per 100 C due to a length expansion. In the case of a gain flattening filter, which is an example of a practical application of long period optical fiber gratings, however, a temperature stability of about 0.3 nm per 100 C is required.

In order to obtain a temperature compensation meeting the above requirement, a method has been used in which the refractive index of the filter is adjusted in such a fashion that the term $d\lambda/d\Lambda$ in Expression 2 has a negative value. There is another conventional method in which the period of the long period optical fiber grating is shortened in such a fashion that a higher-order cladding mode is selected. Another method is also known in which an addition of $B_2O_3$ is made to allow the term "dn/dT" in Expression 2 to have a value of 0.

However, all the above mentioned conventional methods use complicated processes because they involve a refractive index adjustment in the filter or an addition of a material serving to avoid a variation in refractive index caused by a variation in temperature. U.S. Pat. No. 5,757,540 for *Long-Period Fiber Grating Devices Packaged For Temperature Stability* to Judkins et al discloses a material package surrounding the cladding about the long-period grating for temperature stability. However, Judkins et al '540 does not disclose coating the region of the optical fiber cladding absent from a long period grating. What is needed is an optical fiber with two separate coatings, one for the region containing the long period grating and the other for the region absent the long period grating. This would result in an optical fiber with a uniform diameter in all regions which is easier to handle and use.

SUMMARY OF THE INVENTION

Therefore, an object of the invention is to provide a long period optical fiber grating filter which is coated with a material serving to shift a coupling wavelength of the filter in a direction opposite to that of a coupling wavelength shift caused by a variation in temperature.

It is another object to apply one type of coating to the cladding surrounding a long period grating in the optical fiber and to apply a separate and different coating to the cladding surrounding portions of the optical fiber absent of the long period grating.

It is yet another object to have the two different coatings adjacent to each other and have equal inner and outer radiuses so that the fiber construction is smooth and has a uniform diameter throughout the length of the optical fiber.

In accordance with the present invention, this object is accomplished by providing a long period optical fiber grating filter comprising: a core formed with a long period grating; a cladding surrounding the core; a coating coated over a portion of the cladding not surrounding the long period grating; and a re-coating coated over a portion of the cladding surrounding the long period and made of a material exhibiting an increase in refractive index in accordance with an increase in temperature, the re-coating serving to allow a coupling wavelength shift caused by the increase in refractive index to be carried out in a direction opposite to that of a coupling wavelength shift caused by a refractive index difference between the core and the cladding.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings, in which like reference symbols indicate the same or similar components, wherein.

DETAILED DESCRIPTION OF THE INVENTION

Figure 1A:
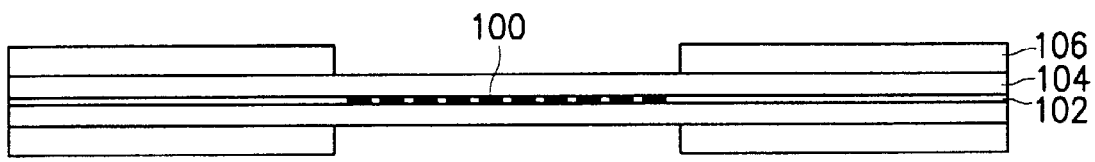
FIG. 1A is a cross-sectional view illustrating a long period optical fiber grating filter.

FIG. 1A is a cross-sectional view illustrating a long period optical fiber grating filter. As shown in FIG. 1A, the long period optical fiber grating filter includes an optical fiber having a core 102 formed with a long period grating 100, a cladding 104 surrounding the core 102 along with the long period grating 100, and a coating surrounding the cladding 104.

The long period grating 100 is formed by partially removing the coating 106 of the optical fiber, which is sensitive to ultraviolet rays, and then radiating an ultraviolet laser onto the optical fiber while using an amplitude mask (not shown) adapted to transmit the ultraviolet laser at intervals of a certain period, thereby inducing a periodic refractive index variation in the core 102.

Figure 1B:
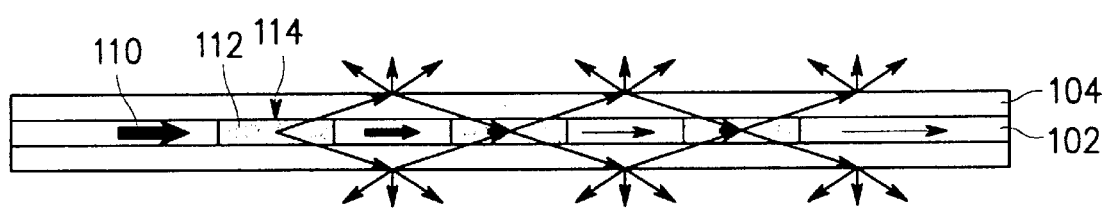
FIG. 1B is a view illustrating an operation in the long period optical fiber grating filter of FIG. 1A to couple a core mode to a cladding mode.

FIG. 1B illustrates an operation in the long period optical fiber grating filter of FIG. 1A to couple a core mode to a cladding mode. A fundamental guided mode 110 propagating in the core 102 is scattered while passing through refractive index variation regions 112. The scattered light, which is denoted by the reference numeral 114, is coupled to the cladding 104, so that it is coherently reinforced to have a wavelength meeting a desired phase matching condition. As the light having the above wavelength is emitted from the cladding 104, the long period optical fiber grating filter operates as a wavelength-dependant attenuator. The fundamental guided mode is attenuated in intensity while passing through the refractive index variation regions 112. On the other hand, the light having the wavelength coupled to the cladding 104 exhibits a gradual increase in intensity. In FIG. 1B, a higher intensity of light is indicated by a thicker arrow. Each of the refractive index variation regions 112 corresponds to the long period grating shown in FIG. 1A.

The ambient condition around a portion of the cladding, where the long period grating as mentioned above is arranged, is air having a refractive index of 1. Where the cladding is re-coated with a material having a refractive index of n after the formation of the long period grating, a variation in coupling condition occurs. As a result, the coupling wavelength is shifted toward a longer wavelength or toward a shorter wavelength.

Figure 2A:
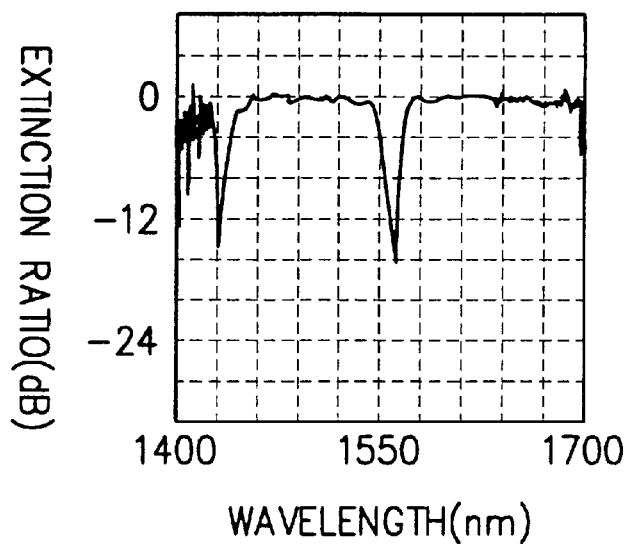
FIGS. 2A to 2D are graphs depicting different coupling peak shifts depending on different refractive indicia exhibited around the cladding, respectively.
Figure 2B:
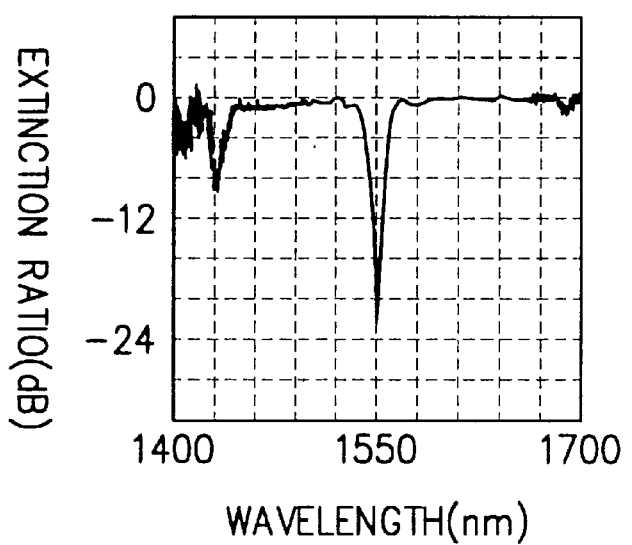
Figure 2C:
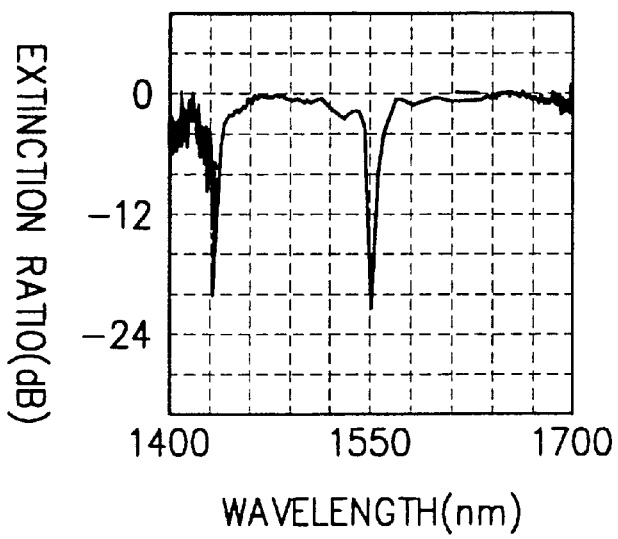
Figure 2D:
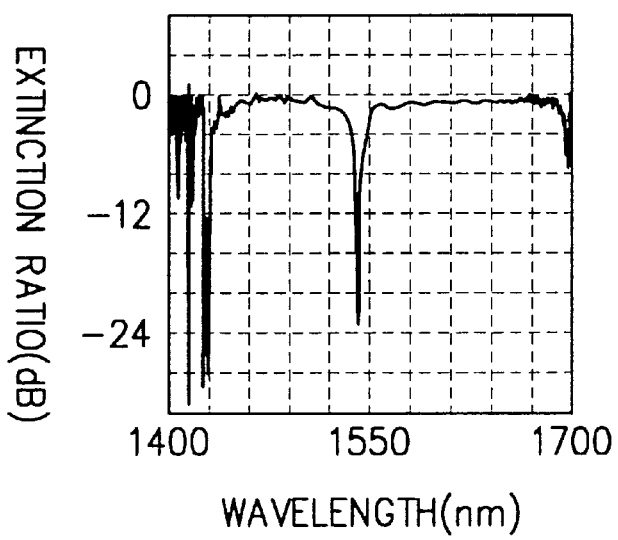

FIGS. 2A to 2D depict different coupling peak shifts depending on different refractive indicia exhibited around the cladding, respectively. FIG. 2A illustrates transmission characteristics of light in the case in which the refractive index exhibited around the cladding of a long period grating is 1. FIG. 2B illustrates transmission characteristics of light in the case in which the refractive index exhibited around the cladding of the long period grating is 1.400. Referring to FIGS. 2A and 2B, it can be found that an increase in extinction ratio occurs in accordance with an increase in refractive index exhibited around the cladding. FIG. 2C illustrates transmission characteristics of light in the case in which the refractive index exhibited around the cladding of the long period grating is 1.448. Referring to FIG. 2C, it can be found that the coupling wavelength is shifted toward a shorter wavelength by about 16.5 nm. FIG. 2D illustrates transmission characteristics of light in the case in which the refractive index exhibited around the cladding of the long period grating is 1.484. Referring to FIG. 2D, it can be found that the coupling wavelength is shifted toward a longer wavelength, as compared to the case in which the refractive index exhibited around the cladding is 1. In this case, a decrease in extinction ratio also occurs.

Thus, a coupling wavelength shift toward a shorter wavelength occurs when the refractive index exhibited around the cladding increases from 1 while being less than the refractive index of the cladding, as in the case of FIGS. 2B or 2C. However, when the refractive index exhibited around the cladding exceeds the refractive index of the cladding, a coupling wavelength shift toward a longer wavelength occurs, as in the case of FIG. 2D. Where the refractive index exhibited around the cladding is equal to the refractive index of the cladding, the total reflection condition is lost, so that coupling peaks disappear.

Figure 3:
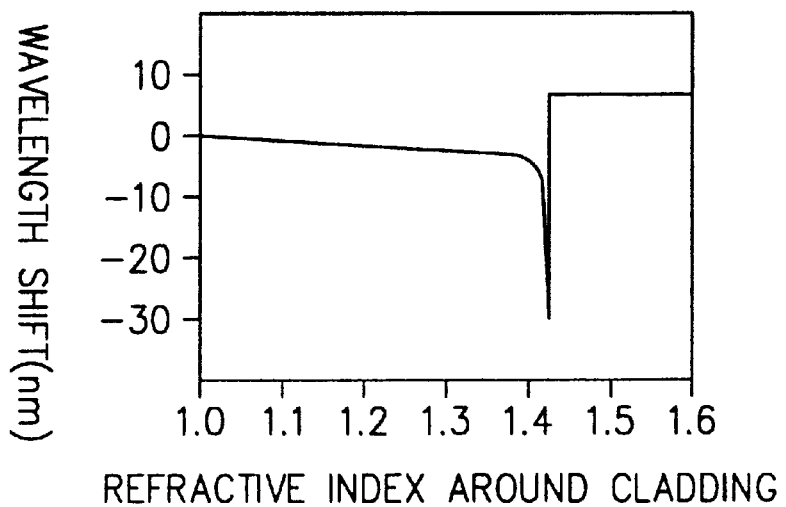
FIG. 3 is a graph depicting a coupling wavelength shift depending on the refractive index exhibited around the cladding.

FIG. 3 depicts a coupling wavelength shift depending on the refractive index exhibited around the cladding. Referring to FIG. 3, it can be found that the coupling wavelength is shifted toward a shorter wavelength as the refractive index exhibited around the cladding increases from 1. When the refractive index around the cladding is rendered to be equal to the refractive index of the cladding, coupling peaks disappear. As the refractive index around the cladding exceeds the refractive index of the cladding, the coupling wavelength is shifted toward a longer wavelength.

In order to vary the refractive index exhibited around the cladding, the coating of the optical fiber is removed at a region where the long period grating is formed, in accordance with the present invention. The portion of the optical fiber exposed after the partial removal of the coating is re-coated with a material exhibiting a variation in refractive index depending on a variation in temperature. Preferably, the re-coating material exhibits an increase in refractive index in accordance with an increase in temperature. As the refractive index of the re-coating material increases, the coupling wavelength of the long period grating is shifted toward a shorter wavelength.

If the re-coating material exhibits a decrease in refractive index in accordance with an increase in temperature, the coupling wavelength of the long period grating is then shifted toward a longer wavelength. For example, the Flexcor 1060 manufactured by Corning Glass Corporation exhibits a temperature sensitivity of about 5 nm per 100 C where it is not coated with the above mentioned re-coating material. However, where the Flexcor 1060 is coated with silicon resin as the above mentioned re-coating material, it exhibits a temperature sensitivity of about 10 nm per 100 C. This effect results from an effect of the coupling wavelength shifted toward a longer wavelength due to a decrease in the refractive index of the silicon resin, used as the re-coating material, in accordance with an increase in temperature, in addition to a phenomenon of the coupling wavelength shifted toward a longer wavelength in accordance with the first term of the right side in Expression 2 as mentioned above.

Accordingly, a desired temperature compensation effect can be obtained by using, as a re-coating material, a material exhibiting an increase in refractive index in accordance with an increase in temperature. Such a re-coating material for the temperature compensated long period grating filter should have desired characteristics. That is, the re-coating material should have an initial refractive index less than that the refractive index of the material of the cladding, for example, pure silica, while having characteristics capable of exhibiting an increase in refractive index in accordance with an increase in temperature, thereby shifting the coupling wavelength of the grating toward a shorter wavelength.

Figure 4:
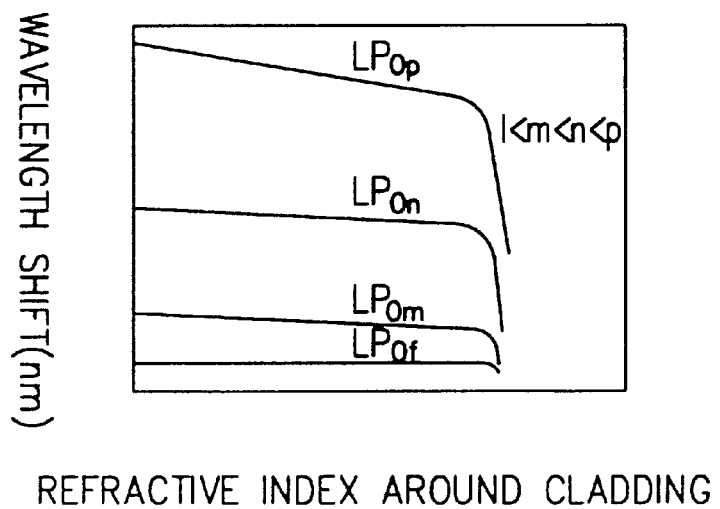
FIG. 4 is a graph illustrating a coupling wavelength shift exhibited at each mode order of an optical signal passing through the long period grating, depending on a variation in refractive index exhibited around the cladding.

FIG. 4 is a graph illustrating a coupling wavelength shift depending on a variation in refractive index exhibited around the cladding. In FIG. 4, the reference characters LPO1 to LPOP represent respective mode orders of an optical signal passing through the long period grating. The mode order of the optical signal increases along the vertical axis of the graph shown in FIG. 4. Referring to FIG. 4, it can be found that the coupling wavelength at each mode order is shifted toward a shorter wavelength in accordance with an increase in the external refractive index.

Figure 5A:
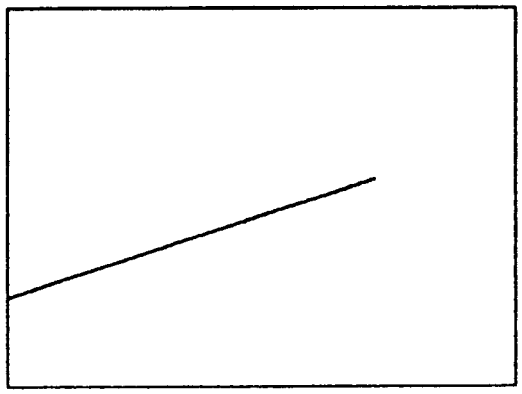
FIGS. 5A to 5D illustrate a temperature compensation mechanism of the long period grating filter according to the present invention, respectively.
Figure 5B:
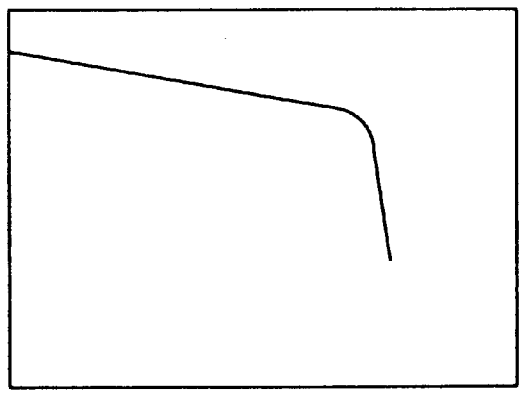
Figure 5C:
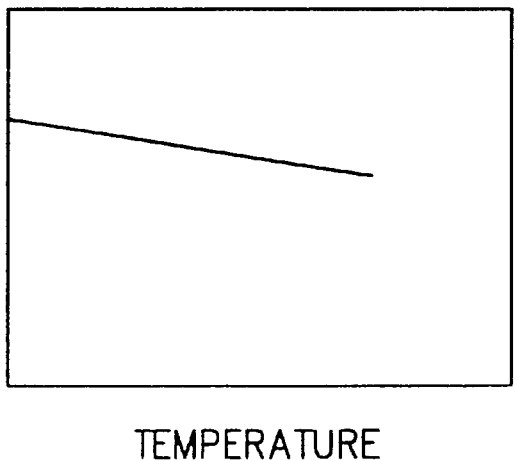

FIGS. 5A to 5D illustrate a temperature compensation mechanism of the long period grating filter according to the present invention, respectively. FIG. 5A depicts refractive index variation characteristics of the re-coating material depending on temperature. Referring to FIG. 5A, it can be found that an increase in refractive index occurs in accordance with an increase in temperature. FIG. 5B depicts a coupling wavelength shift depending on an external refractive index exhibited around the cladding. Referring to FIG. 5B, it can be found that the coupling wavelength is shifted toward a shorter wavelength in accordance with an increase in external refractive index. FIG. 5C depicts a coupling wavelength shift depending on temperature. Referring to FIG. 5C, it can be found that an increase in temperature causes an increase in the refractive index of the re-coating material, thereby resulting in a coupling wavelength shift toward a shorter wavelength.

Figure 5D:
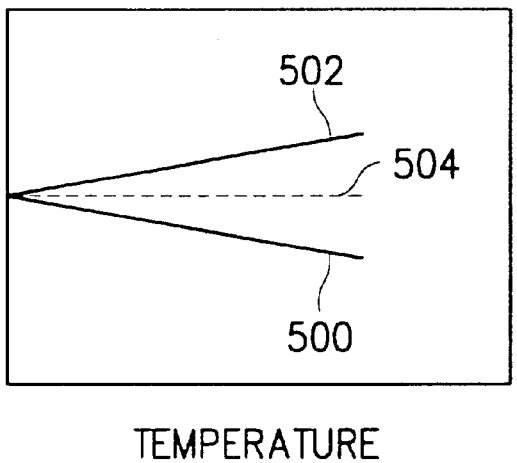

On the other hand, FIG. 5D depicts a temperature compensation effect of the long period grating exhibited depending on temperature. In FIG. 5D, the graph 500 depicts a coupling wavelength shift depending on the temperature of the re-coating material. The graph 502 depicts a coupling wavelength shift depending on a refractive index difference between the core and cladding exhibited depending on temperature. The graph 504 is a graph depicting a result obtained after a compensation between the coupling wavelength shifts respectively shown in the graphs 500 and 502. Referring to the graph 504, it can be found that there is no coupling wavelength shift even when an increase in temperature occurs.

Figure 6:
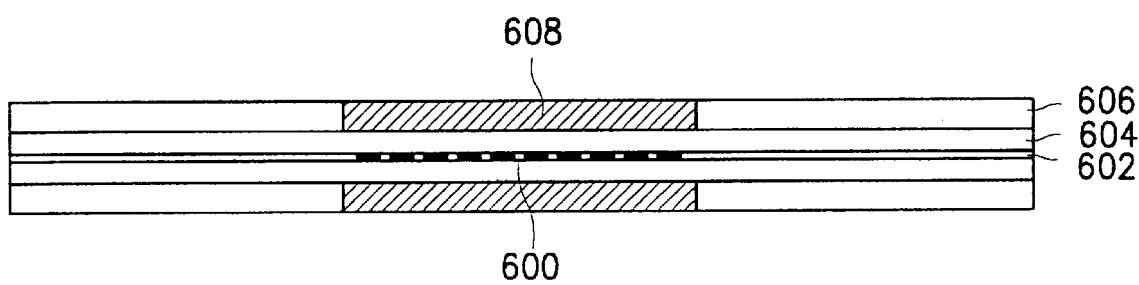
FIG. 6 is a cross-sectional view illustrating the structure of the temperature compensated long period grating filter according to the present invention.

FIG. 6 is a cross-sectional view illustrating the structure of the temperature compensated long period grating filter according to the present invention. In FIG. 6, the reference numeral 600 denotes the long period, 602 the core, 604 the cladding surrounding the long period grating and core, 606 the coating, and 608 the re-coating surrounding the portion of the cladding arranged at the region where the long period grating is formed. As mentioned above, the re-coating is preferably made of a material having a refractive index increasing in accordance with an increase in temperature while being less than the refractive index of the cladding.

In accordance with the present invention, it is possible to compensate for a coupling wavelength shift occurring due to an increase in temperature by re-coating a material, exhibiting an increase in refractive index in accordance with an increase in temperature, over the long period grating. Accordingly, a temperature compensation can be more easily achieved in accordance with the present invention, without any inconvenience caused by an adjustment of refractive index in the filter or an addition of a material for avoiding a variation in refractive index depending on temperature.

While the present invention has been particularly shown and described with reference to a particular embodiment thereof, it will be understood by those skilled in the art that various changes in form and detail may be effected therein without departing away from the scope of the invention as defined by the appended claims.

What is claimed is:

1. A long period optical fiber grating filter, comprising:

a core formed having a long period grating;

a cladding surrounding the core;

a first coating coated over a portion of the cladding not surrounding the long period grating; and a second coating coated over a portion of the cladding surrounding the long period and made of a material exhibiting an increase in refractive index in accordance with an increase in temperature, the second coating serving to allow a coupling wavelength shift caused by the increase in refractive index to be carried out in a direction opposite to that of a coupling wavelength shift caused by a refractive index difference between the core and the cladding.

2. The long period optical fiber grating filter according to claim 1, wherein the material of the second coating has a refractive index increasing in accordance with an increase in temperature while being less than the refractive index of the cladding.

3. The optical fiber of claim I, an inner radius of said first coating is equal to an inner radius of said second coating and an outer radius of said first coating is equal to said outer radius of said second coating.

4. An optical fiber, comprising:
- a core, said core periodically comprising a long period optical fiber grating;
- a cladding surrounding said core;
- a first coating surrounding said cladding only in portions of said optical fiber absent of a long period grating; and
- a second coating comprised of material different from said first coating, said second coating surrounding portions of said optical fiber that contain said long period grating.

5. The optical fiber of claim 4, said second coating exhibiting an increase in refractive index with increased temperature.

6. The optical fiber of claim 5, said second coating having an index of refraction less than an index of refraction of said cladding.

7. The optical fiber of claim 6, an inner radius of said first coating is equal to an inner radius of said second coating and an outer radius of said first coating is equal to said outer radius of said second coating.

* * * * *